United States Patent
Asano

(10) Patent No.: US 6,477,577 B1
(45) Date of Patent: *Nov. 5, 2002

(54) NETWORK CONNECTION SYSTEM AND CONNECTION SUBSTITUTE CORRESPONDENCE CLIENT

(75) Inventor: Kazuo Asano, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/714,532

(22) Filed: Sep. 16, 1996

(30) Foreign Application Priority Data

Apr. 5, 1996 (JP) ............................................. 8-083398

(51) Int. Cl.⁷ ............................................. G06F 15/16
(52) U.S. Cl. ..................................... 709/227; 709/238
(58) Field of Search ....................... 395/200.33, 200.48, 395/200.49, 200.57, 200.16, 200.69, 200.75, 200.59; 709/203, 218, 219, 227, 239, 245, 229

(56) References Cited

U.S. PATENT DOCUMENTS

| | | | | |
|---|---|---|---|---|
| 5,136,580 A | * | 8/1992 | Videlock et al. | 370/60 |
| 5,329,527 A | * | 7/1994 | Ujihashi et al. | 370/85.13 |
| 5,355,365 A | * | 10/1994 | Bhat et al. | 370/85.13 |
| 5,519,858 A | * | 5/1996 | Walton et al. | 395/600 |
| 5,729,689 A | * | 3/1998 | Allard et al. | 395/200.58 |
| 5,742,762 A | * | 4/1998 | Scholl et al. | 395/200.3 |
| 5,856,974 A | * | 1/1999 | Gervais et al. | 370/392 |
| 5,898,780 A | * | 4/1999 | Liu et al. | 380/25 |

\* cited by examiner

Primary Examiner—Dung C. Dinh
Assistant Examiner—Tod Kupstas
(74) Attorney, Agent, or Firm—Staas & Halsey LLP

(57) ABSTRACT

A connection substitute server substitutes a connection between a host machine having an informal address or a private address and a host machine out of an organization having a formal address and relays them. A correspondence relation between the host machine having no formal address and the connection substitute server has previously been registered as connection substitute server information in a name server. When receiving a communication request in which a host name of a connection request destination has been designated, a connection substitute correspondence client requests a retrieval of the connection substitute server information to the name server, requests a connection substitute with the host machine having the informal address or private address of the connection request destination to the connection substitute server recognized from the retrieval result, and enables a connection with the host machine which belongs to another organization and doesn't have a formal address.

10 Claims, 11 Drawing Sheets

FIG. 3

| HOST NAME | KIND OF RECORD | IP ADDRESS etc. |
|---|---|---|
| host-aaa.fujitsu.co.jp | A | 133. 160. 28. 1 |
| socksserver.fujitsu.co.jp | A | 133. 160. 1. 1 |
| host-bbb.fujitsu.co.jp | A | 10. 0. 0. 1 |
| host-bbb.fujitsu.co.jp | SS | socksserver.fujitsu.co.jp |

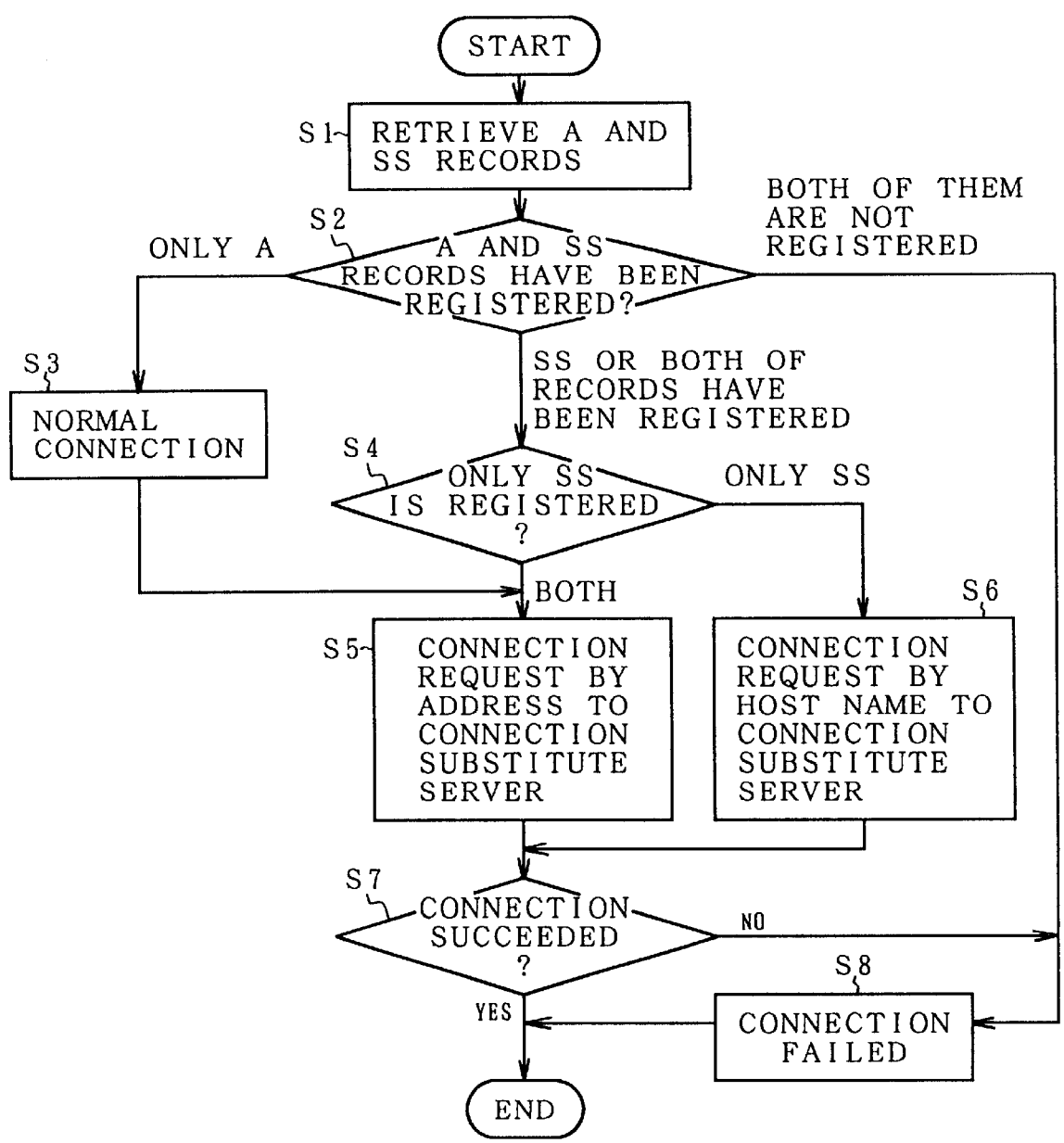

NETWORK CONNECTION SYSTEM AND CONNECTION SUBSTITUTE CORRESPONDENCE CLIENT

BACKGROUND OF THE INVENTION

The invention relates to a network connection system for communicating between hosts of a computer network constructing an internet and to a connection substitute correspondence client. More particularly, the invention relates to a network connection system in which a communication from a host out of an organization to a host which doesn't have a formal IP address is smoothly progressed by a substitute connection and to a connection substitute correspondence client.

In the recent rapid development of the internet, a problem such that the number of IP addresses [internet protocol addresses: hereinafter, referred to as "formal addresses"] lacks due to an increase in number of hosts is becoming serious. It is presumed that it is difficult to connect the host to the internet and to participate in the internet of the organization. A method of solving it is required. Actually, in the organization in which the number of formal addresses lacks, informal addresses which are not formally allocated and local addresses (private addresses of the reference standard RFC1597 of the internet) which can be used only in the organization are allocated to the hosts in the organization. However, the hosts which don't have the formal addresses cannot directly communicate with the host which has the formal address and which is connected to the internet. Therefore, a network connection system having a connection substitute server is provided in order to enable a communication between a host which doesn't have the formal address and which belongs to the first organization (hereinafter, such a host is referred to as an "intra-organization host") and a host which has a formal address and which belongs to the second organization different from the first organization (hereinafter, such a host is referred to as an "out-of-organization host"). The connection substitute server is generally realized by a server called an "application gateway server". In the network connection system, the connection substitute server having the formal addresses is located at a position where it can be accessed from both of the host which doesn't have the formal address in the organization and the host having the formal address out of the organization, ordinarily, at a position near a relay point between the intra-organization and the out-of-organization. When a communication request of the host in the organization is received, the connection substitute server accesses to the host out of the organization in place of the host in the organization. In this case, it is necessary for the user to prepare a client software of the connection substitute server correspondence and to previously designate the connection substitute server to be used.

Hitherto, in the network connection system such as Socks Protocol Version 4.4 of the INTERNET-DRAFT (draft before it becomes the reference standard RFC), CERN httpd proxy, or the like, the system mainly corresponds to a connection request from the intra-organization to the out-of-organization. Namely, when a connection from the intra-organization to the out-of-organization is requested, the host having the informal address or local address in the organization requests a retrieval of addresses to a name server in which the hosts having formal addresses have already been registered by designating a host name. Subsequently, the host having the informal address or local address presents the formal address obtained from the name server by the retrieval and requests for the connection substitute to the connection substitute server which has been preset in a connection substitute correspondence client. In this instance, there is a prerequisite such that the connection request source is the intra-organization host (host of the first organization) having the informal address or local address and the connection destination is the out-of-organization host (host of the second organization different from the first organization) having the formal address. Therefore, the address of the connection destination is unique and can specify the host. So long as there is at least one connection substitute server, it is possible to communicate with the host having the formal address in the world. Therefore, it is; sufficient that the connection substitute server which is used by himself is fixedly set as a correspondence client of the connection substitute server.

In such a conventional network connection system, however, on the contrary, for a connection request from out-of-organization to the intra-organization, there is a prerequisite such that the connection request source is the host having the formal address out of the organization and the connection destination is the host having the informal address or local address in the organization which cannot be used in a place out of the organization. Therefore, the address of the host of the connection destination is not unique and there is a possibility such that the same address is used in a plurality of different organizations. Thus, the host of the connection destination cannot be specified by the informal address or local address indicative of the connection destination. Therefore, the connection substitute server having the formal address of the organization to which the connection destination host having only the informal address or local address belongs has to be preset on the connection request source side. Therefore, when it is intended to communicate with the host which doesn't have the formal address and which belongs to another organization, there occurs a problem such that the informal address or local address of the host to be connected and the formal address of the connection substitute server of the organization to be connected have to be manually examined and the formal address of the connection substitute server has to be reset each time by a partner destination to be connected.

SUMMARY OF THE INVENTION

According to the invention, there are provided a network connection system and a connection substitute correspondence client, in which a connection to a host which belongs to another organization and which doesn't have a formal address is automatically established by a simple connection request such as to present only a host name, thereby enabling a communication with the host which belongs to such another organization and which doesn't have the formal address to be performed.

First, a network connection system of the invention has a connection substitute server which is generally called an "application gateway server". The connection substitute server substitutes the connection between a host machine having an informal address that is not formally allocated or a local address that is used in the organization and doesn't flow path information to the outside and a host machine which has the formal address and which is out of the organization and the server relays. The network connection system of the invention has a name server. A correspondence relation between the host machine which doesn't have the formal address and the connection substitute server has previously been registered as connection substitute server information in the name server. Further, the network connection system of the invention has a connection substitute correspondence client. When a communication request in which a host name of a connection request destination has been designated is received, the connection substitute correspondence client requests the name server to retrieve the connection substitute server information and also requests the connection substitute server recognized from the retrieval result to substitute the connection with the host machine having the informal address or local address of the connection request destination. According to such a construction, the connection to the host machine which belongs to another organization and doesn't have the formal address is enabled. The address information is registered into the name server in correspondence to the host name. When the address information doesn't indicate the formal address, namely, in case of the informal address or local address, the allocated connection substitute server information is registered. As such connection substitute server information, there are a host name and a formal address of the connection substitute server. For example, as a formal address, an IP address of an internet protocol network is registered in the name server. The connection substitute correspondence client has: a retrieving mechanism for requesting the name server to retrieve by a communication request; a control mechanism for instructing a connection with the connection request destination on the basis of the retrieval result from the name server received by the retrieving mechanism; and a connecting mechanism for connecting with the connection request destination on the basis of a connecting instruction of the control mechanism. In this case, when the registration of the formal address of the connection request destination is recognized by the retrieval of the name server, the control mechanism of the connection substitute correspondence client instructs the connecting mechanism to connect with a machine having the formal address of the connection request destination. When the registration of the connection substitute server information of the connection request destination is recognized by the retrieval of the name server, the control mechanism of the connection substitute correspondence client instructs the connecting mechanism to connect with the recognized connection substitute server. On the other hand, when neither the registration of the formal address of the connection request destination nor the registration of the connection substitute server information can be recognized by the retrieval of the name server, the control mechanism of the connection substitute correspondence client notifies of a connection error and finishes the processes.

Further, the network connection system of the invention provides a form of the connection substitute correspondence client when presuming a case where the informal addresses are abandoned and only the local addresses (including the private address of RFC1597) are used. The form of the connection substitute correspondence client comprises: an address retrieving mechanism for requesting the name server to retrieve address information of a connection request destination by a communication request; a local address judging mechanism to judge whether the address information registered in the name server by the retrieval of the address retrieving mechanism is a local address or not; a connection substitute server retrieving mechanism for requesting the name server to retrieve substitute server information when the registration of the local address is judged by the local address judging mechanism; a control mechanism for instructing a connection with the connection request destination on the basis of a judgment result of the local address judging mechanism and a retrieval result of the connection substitute server retrieving mechanism; and a connecting mechanism for connecting with the connection request destination on the basis of the connecting instruction of the control mechanism. Namely, the connection substitute correspondence client executes the retrieval of the name server of two stages such that the address information is first retrieved from the host name of the connection request destination and, when the local address is judged, the connection substitute server information is retrieved. In the retrieval at two stages, when the local address judging mechanism judges the registration of the formal address of the connection request destination by the retrieval of the name server by the address information retrieving mechanism, the control mechanism of the connection substitute correspondence client instructs the connecting mechanism to connect with a machine of the connection request destination having the formal address. In this case, when the address information is not registered for the retrieval of the name server by the address retrieving mechanism, a connection error is notified and the processes are finished. On the basis of the judgment result of the local address, when the registration of the connection substitute server information of the connection request destination is recognized by the retrieval of the name server by the connection substitute server retrieving mechanism, the control mechanism of the connection substitute correspondence client instructs the connecting mechanism to connect with the recognized connection substitute server. In this case, when the connection substitute server information is not registered for the retrieval of the name server by the connection substitute server retrieving mechanism, a connection error is notified and the processes are finished.

Further, according to the invention, the connection substitute correspondence client itself which is used in the network connection system is provided. In response to a communication request in which a host machine having no formal address in the organization is set to a connection request destination, the connection substitute correspondence client requests the name server to retrieve the connection substitute server for substituting the connection with the host machine having the formal address out of the organization and for relaying, requests the connection substitute server recognized from the retrieval result to execute the connection substitute with the host machine of the connection request destination, and enables the connection to the host machine which belongs to another organization and which doesn't have the formal address. The other feature of the connection substitute correspondence client is fundamentally the same as that of the network connection system.

As a modification of the network connection system of the invention, in addition to the connection substitute server for substituting the connection between the host machine belonging to the first organization and the host machine which doesn't have the formal address and which belongs to the second organization different from the first organization and for relaying, there are provided: a first name server in which a correspondence relation between the host machine having no formal address and the connection substitute server has previously been registered as connection substitute server information; and a second name server in which a correspondence relation between the host name of the host machine which belongs to the second organization and which doesn't have the formal address in the second organization and the informal address or local address of the host machine has previously been registered as informal/local address information. In this case, in response to a communication request in which the host name of the connection request destination has been designated, the connection substitute correspondence client requests the first name server to retrieve the connection substitute server information, presents the host name of the host machine of the connection request destination to the connection substitute server recognized from the retrieval result, and requests such a server to execute the connection substitute. Therefore, on the basis of the connection substituting request by the presentation of the host name from the connection substitute correspondence client, the connection substitute server requests the second name server to retrieve the informal/local address information by the host name, and substitutes the connection between the host machine of the connection request destination recognized from the retrieval result and the connection substitute correspondence client.

According to such a network connection system and a connection substitute correspondence client of the invention, when the user who uses the host (client in the present invention) belonging to the first organization requests a connection with the host which belongs to the second organization as another organization and which has an informal address or local address in the second organization, a connection request in which the host name of the connection request destination has been designated is executed to the connection substitute correspondence client. In response to the connection request, a retrieval of the connection substitute server information using the host name is requested to the name server. The informal address or local address of the connection request destination and the host name and formal address of the connection substitute server are confirmed. When there is a registration of them, a connection substitute to the host in the organization is requested to the registered connection substitute server and a communication with the host having no formal address can be performed.

When the informal addresses are not generally used and addresses which are used in the organization are only the local addresses, when receiving the connection request from the host out of the organization, the connection substitute correspondence client first retrieves the name server to see whether the address information that is designated by the host name has been registered or not. By the address retrieval, only when the registered address is the local address, the retrieval of the connection substitute server information is requested to the name server. The connection substitute to the host in the organization is requested to the registered connection substitute server. A communication with the host having the local address is executed. Therefore, the unnecessary retrieval of the connection substitute server information for the name server when the registered address is not the local address can be prevented.

The above and other objects, features, and advantages of the present invention will become more apparent from the following detailed description with reference to the drawings.

BRIEF DESCRIPTION OF THE DRAWINGS

FIG. 3 is an explanatory diagram of contents in a connection substitute server information registering unit in FIG. 2;

FIG. 11 is a flowchart for the processing operation of a connection substitute correspondence client in FIG. 10.

DETAILED DESCRIPTION OF THE PREFERRED EMBODIMENTS

Figure 1:
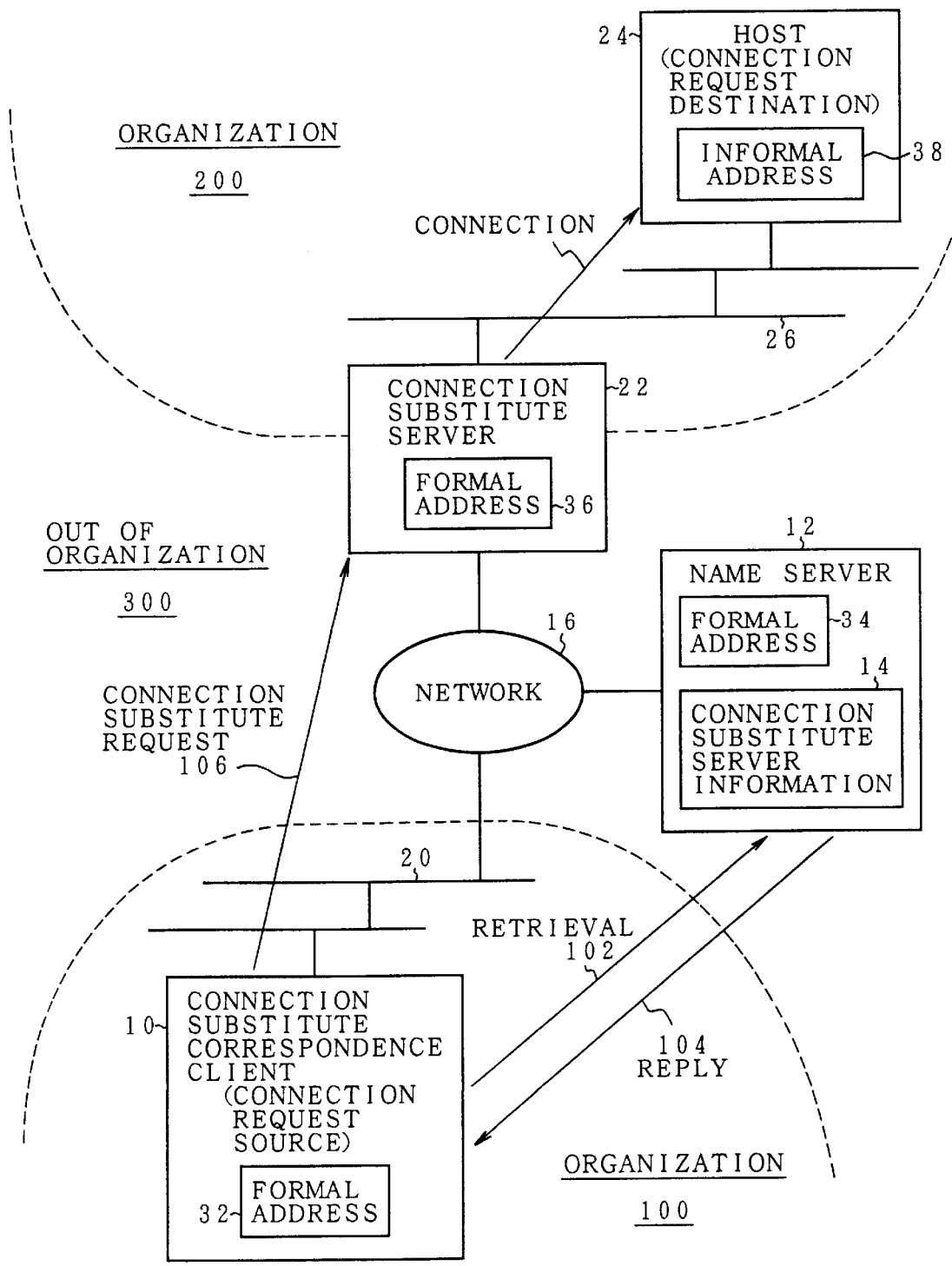
FIG. 1 is a system block diagram of the first embodiment of the invention.

FIG. 1 is a system constructional diagram showing the first embodiment of a network connection system of the invention. Organizations 100 and 200 realize a computer network through a network 16, specifically, construct an internet protocol network. The organization 100 has an internal network 20 and a connection substitute correspondence client 10 is connected to the internal network 20. A plurality of other hosts are connected to the internal network 20 as necessary. Similarly, the organization 200 also has an internal network 26 and a plurality of machines including a host 24 are connected. In the network 16, a host 18 of the organization 100 has an informal address 30 which is not formally allocated. Similarly, the host 24 of the organization 200 also has an informal address 38. A connection substitute server 22 called an "application gateway server" is provided for the organization 200 in order to enable a communication between the host 24 having the informal address 38 and a host having a formal address out of the organization. The connection substitute server 22 has a formal address 36. As a connection substitute server 22, a socks server which is used in the internet can be used as it is. FIG. 1 shows a construction when the connection substitute correspondence client 10 provided for the organization 100 requests a communication to the host 24 having the informal address 38 provided for the other organization 200. The connection substitute correspondence client 10 has a formal address and can be realized by newly adding the function of the invention to an ordinary socks client. A name server 12 is provided for the network 16. The name server 12 has a formal address 34 and connection substitute server information 14 is newly provided for the name server which is used in the ordinary internet. The connection substitute server information 14 denotes a record to lead the connection substitute server 22 allocated to the host 24 of, for example, the organization 200 having the informal address. Namely, the connection substitute server information 14 is newly extended as a record in a domain name system (DNS) in the ordinary name server 12. In case of the record to lead the socks server, it is assumed that the connection substitute server information is called an "SS record" (socks server record). As a connection substitute server 22, a proper connection substitute server other than the socks server can be used. With respect to all of the host machines having informal addresses of each organization constructing the network 16, generally, the formal addresses have been registered in the name server 12 as address information by using host names of those host machines as indices. In addition to it, according to the invention, the connection substitute server information 14 is newly added to the name server 12. The connection substitute server information 14 is also used by the host machine which doesn't have the formal address and is included in the organization connected to the network 16, namely, the host machine having the informal address which is not formally allocated and is used in the organization. With regard to the host machines which have the local address and don't flow path information to the outside, address information of the informal addresses or local addresses is registered by using host names of such host machines as indices. Further, by using host names of the hosts which don't have the formal addresses as indices, host name and formal address of the connection substitute server of the relevant organization allocated to the host machine are registered. This is because as for the problem such that it is impossible to connect from out of the organization to the host having the informal address or local address in the organization, although the informal address or local address is not unique, the host name can be uniquely allocated by, for example, combining a domain name of the internet, namely, FQDN (Fully-Qualified Domain Name) and a denomination peculiar to the host machine. Therefore, the connection substitute server information using the unique host name is registered into the name server 12, a retrieving request to search the connection substitute server information 14 by using the host name of a connection request destination designated from a connection request source, namely, a request is performed by the connection substitute correspondence client 10, thereby specifying the connection substitute server and enabling a communication with the host machine in the organization having no formal address to be executed. An outline of the processes of the connection substitute correspondence client 10 will now be described. Now assuming that a communication request to the host 24 having the informal address 38 of the organization 200 was received from the user who uses the connection substitute correspondence client 10 in the organization 100, an address and a retrieving request 102 of the connection substitute server information 14 are outputted to the name server 12 by the host name of the host 24 serving as a connection request destination. In response to the retrieving request 102, the name server 12 returns a reply 104 of the relevant address, the formal address of the connection substitute server 22 allocated to the host of the connection request destination by the organization 200, and the host name by the retrieval of the registration information by the host name of the designated connection request destination. Thus, the connection substitute correspondence client 10 recognizes the connection substitute server 22 having the formal address 36 allocated to the host 24 of the connection request destination and executes a connection substitute request 106 with the host 24 to the connection substitute server 22 through the network 16. Namely, the substitute correspondence client 10 knows the socks server as a connection substitute server of the connection request destination by the retrieval by the host name of the name server 12 and performs the connection substitute request 106.

Figure 2:
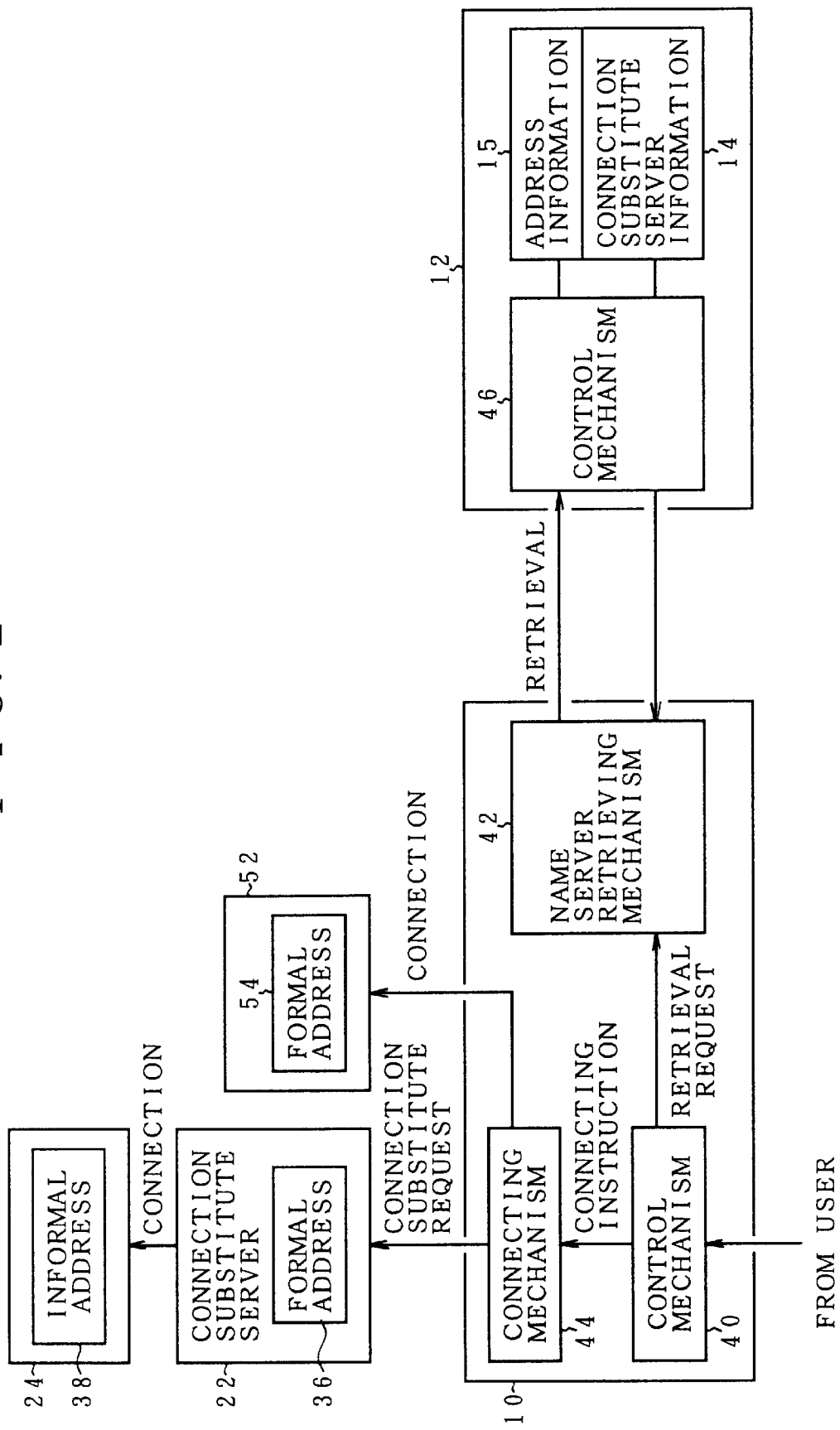
FIG. 2 is a functional block diagram of a connection substitute correspondence client in FIG. 1.

FIG. 2 is a-block diagram of an embodiment of the connection substitute correspondence client 10 in FIG. 1. The connection substitute correspondence client 10 is constructed by a control mechanism 40, a name server retrieving mechanism 42, and a connecting mechanism 44. The name server 12 has a control mechanism 46. As registration information, in addition to address information 15 which has generally been registered, the connection substitute server information 14 newly added in the invention is registered in the name server 12. When receiving a communication request of the user, the name server retrieving mechanism 42 of the connection substitute correspondence client 10 inquires of the name server 12 so as to retrieve the address by the host name of the connection request destination. In response to the inquiry of the address by the host name from the name server retrieving mechanism 42, the control mechanism 46 of the name server 12 first retrieves the address information 15 and responds the address corresponding to the host name. There is also a case where the retrieval address in this case is the informal address or local address in addition to the formal address. At the same time, the control mechanism 46 retrieves the connection substitute server information 14 by using the host name. When the address retrieved from the address information 15 is the informal address or local address, the check result of the formal address and host name of the connection substitute server corresponding to the host name is responded by the connection substitute server information 14. In response to the inquiry of the retrieval from the connection substitute correspondence client 10, the name server 12 also inquires of the name server having not only the registration information of the name server 12 itself but also the connection substitute server information of another organization via the network as necessary. By such a retrieval, if the address information corresponding to the host name and the host name and formal address of the connection substitute server corresponding to the host name have been registered, the result of the inquiry is replied to the connection substitute correspondence client 10. When they are not registered, this fact is replied. The control mechanism 40 of the connection substitute correspondence client 10 instructs the connecting mechanism 44 according to the reply information from the name server 12 received by the name server retrieving mechanism 42. That is, when only the address of the host of the connection request destination is obtained from the reply information of the name server 12 and the host name and formal address of the connection substitute server are not obtained, since the host of the connection request destination has the formal address, the host directly requests a connection by an ordinary method to the connecting mechanism 44, for example, like a host 52 having a formal address 54 without intervening the connection substitute server 22. When the address of the host of the connection request destination and the host name and formal address of the connection substitute server are obtained from the reply information of the name server 12, since the host of the connection request destination has the informal address 38 like, for example, the host 24, the host requests a connection via the connection substitute server 22 to the connecting mechanism 44. When the connection is requested from the control mechanism 40 by an ordinary method without intervening the connection substitute server 22, the connecting mechanism 44 directly connects to, for instance, the host 52 serving as a connection request destination. When the connection to the host 24 having the informal address 38 via the connection substitute server 22 is requested from the control mechanism 40, the connecting mechanism 44 connects with the connection substitute server 22 and requests a substitute connection to the host 24 having the informal address 38 serving as a connection request destination. Further, when the address corresponding to the host name of the connection destination is not obtained by the reply of the name server 12, the control mechanism 40 generates an error message indicative of a connection failure and finishes the processes.

Figure 5:
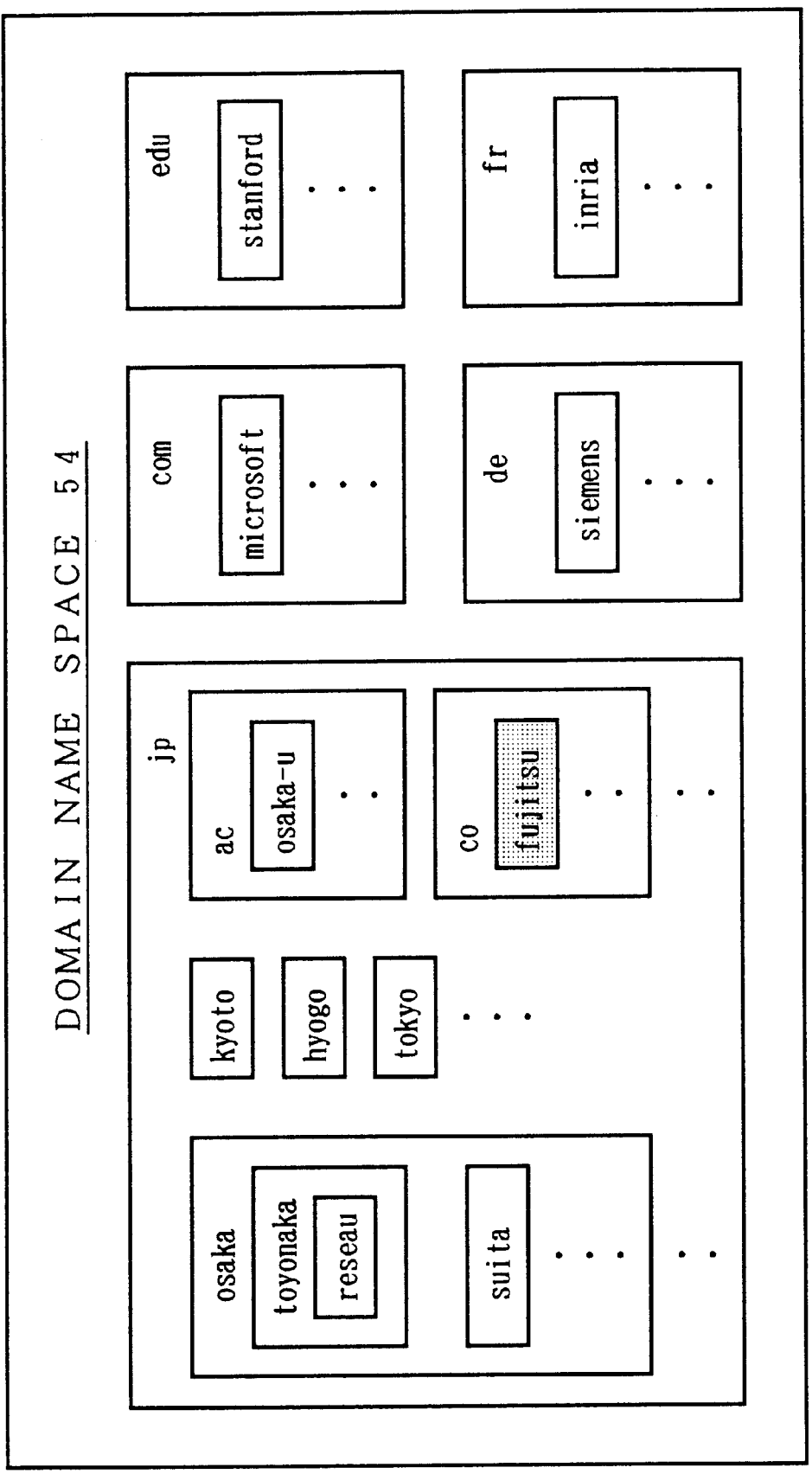
FIG. 5 is an explanatory diagram of a domain name space of an internet.

FIG. 3 is a diagram showing a specific example of the address information 15 and connection substitute server information 14 in the name server 12 in FIG. 2. First, as a host name, a domain name of the internet is added to a peculiar denomination allocated to the host machine in the organization. The domain name conforms with a domain name space 56 in the internet of FIG. 5. Namely, the domain name has a hierarchy structure directing from a large unit to a small unit. The maximum unit serving as a first level of the domain name indicates a country and, for example, in case of Japan, it is a code "jp". Codes "com" and "edu" on the right side denote a network of the U.S.A. and each network has a unit of a country unit with respect to the U.S.A. The contents in the country code "jp" are separated into a district code such as "osaka", "kyoto", . . . , or the like, a code "ac" about an educational institution such as a university or the like, a code "co" indicative of a company on the Commercial Law, etc. as a domain name of the second level. For example, "fujitsu" in the company code "co" of the domain name at the second level denotes an organization code at the third level indicative of the kind of organization. A name comprising a combination of the domain names of the first to third levels is set to "FQDN". The domain name of the host name in FIG. 3 uses "fujitsu. co. jp" as FQDN and a denomination such as "host-aaa." of the host machine that is peculiar in the organization is added. A whole portion is expressed by the host name "host-aaa. fujitsu. co. jp". This host name is unique in the network and one host machine can be specified from all of the host machines by the host name. Subsequent to the host name, a kind of record is provided. The record kind "A" denotes address information. The address information includes the formal address of the network and the informal address or local address which can be used only in the organization. The formal address of the internet is known as an IP address and the address space of 32 bits is divided into a network portion and a host portion and is used. The IP address space is fundamentally divided into three kinds of classes A, B, and C in accordance with a scale of the network. The IP addresses in FIG. 3 are shown with respect to the class B as an example. A range of the network numbers of the class B is set to a range of 128. 1. 0. 0~191. 254. 0. 0. Therefore, "133. 160" of the IP address corresponds to the network portion and denotes the organization "fujitsu". Next "28. 1" corresponds to the address portion in the network and, for example, 1. 1~254. 254 can be used. The IP address of 32 bits is divided into octets (divided on a 8-bit unit basis) and is expressed by the decimal notation.

Figure 4:
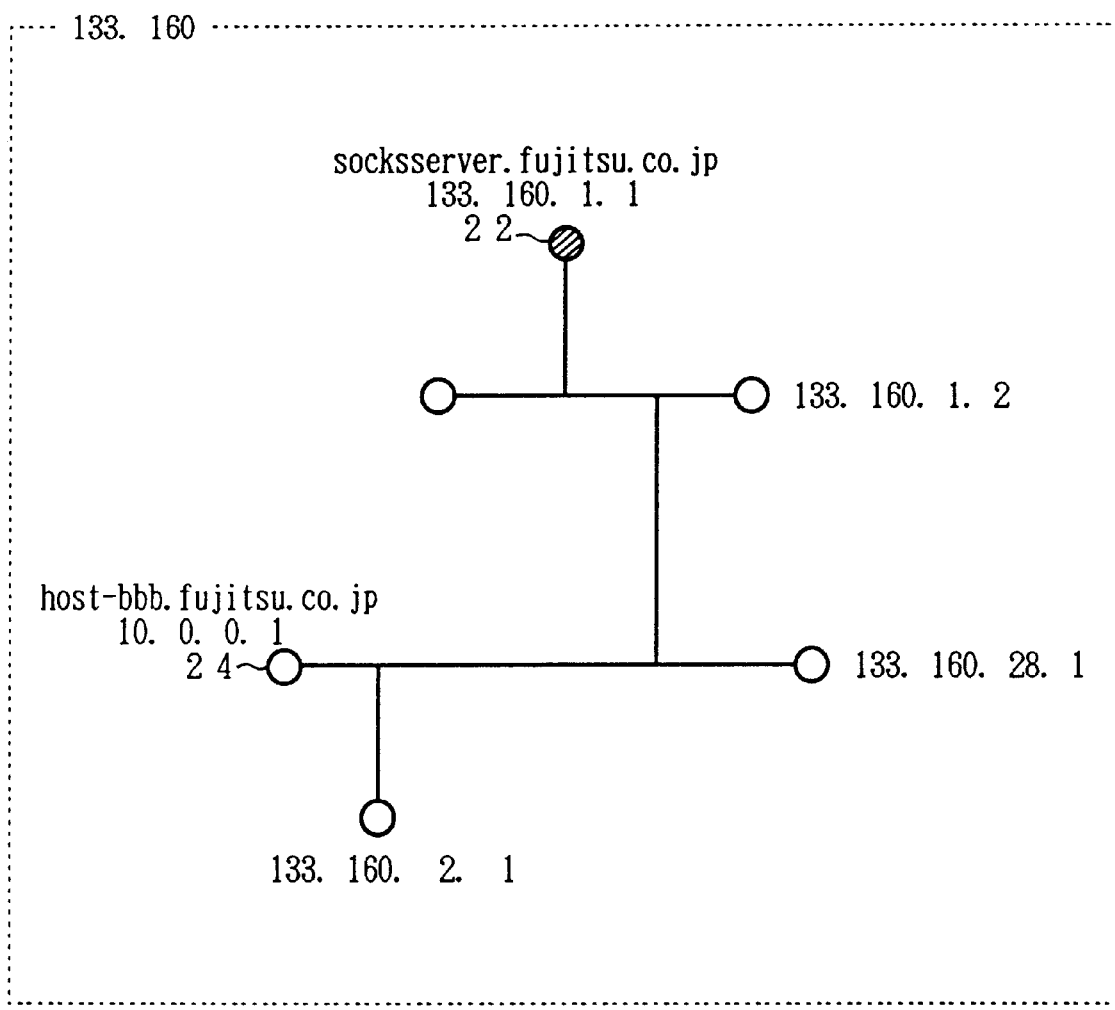
FIG. 4 is an explanatory diagram of a network construction and addresses in an organization in FIG. 3.

FIG. 4 shows a computer network of an address space "133. 160" of the network portion corresponding to the registration contents in FIG. 3. The connection substitute server 22 has a formal address "133. 160. 1. 1". The host 24 which receives a communication request from out of the organization has an informal address "10. 0. 0. 1". Such an informal address is not an address which was formally allocated in accordance with an address space per hierarchy of the internet. Further, the connection substitute server 22 has a host name "socksserver. fujitsu. co. jp". The host 24 has a host name "host-bbb. fujitsu. co. jp".

With respect to the registration contents in FIG. 3, when receiving a communication request for the host 24 in the organization having the informal address 38, the connection substitute correspondence client 10 requests the name server 12 to retrieve by using the host name "host-bbb. fujitsu. co. jp". Therefore, the corresponding host name is found at the third and fourth lines by referring to the registration contents in FIG. 3. As registration contents of the second line, the record kind "A" and address "10. 0. 0. 1" are obtained. A record kind "SS" and a host name "socksserver. fujitsu. co. jp" of the connection substitute server 22 which was allocated of the fourth line are obtained. By the retrieval of the registration contents by the host name of the connection substitute server 22, a record kind (registration of computer resources: resource record) "A" of the second line can be obtained and "133. 160. 1. 1" can be derived as a formal address 36 of the connection substitute server 22. The form of the registration contents of the address information 15 and connection substitute server information 14 which have been registered in the name server 12 can be set to a proper registration structure as necessary.

Figure 6:
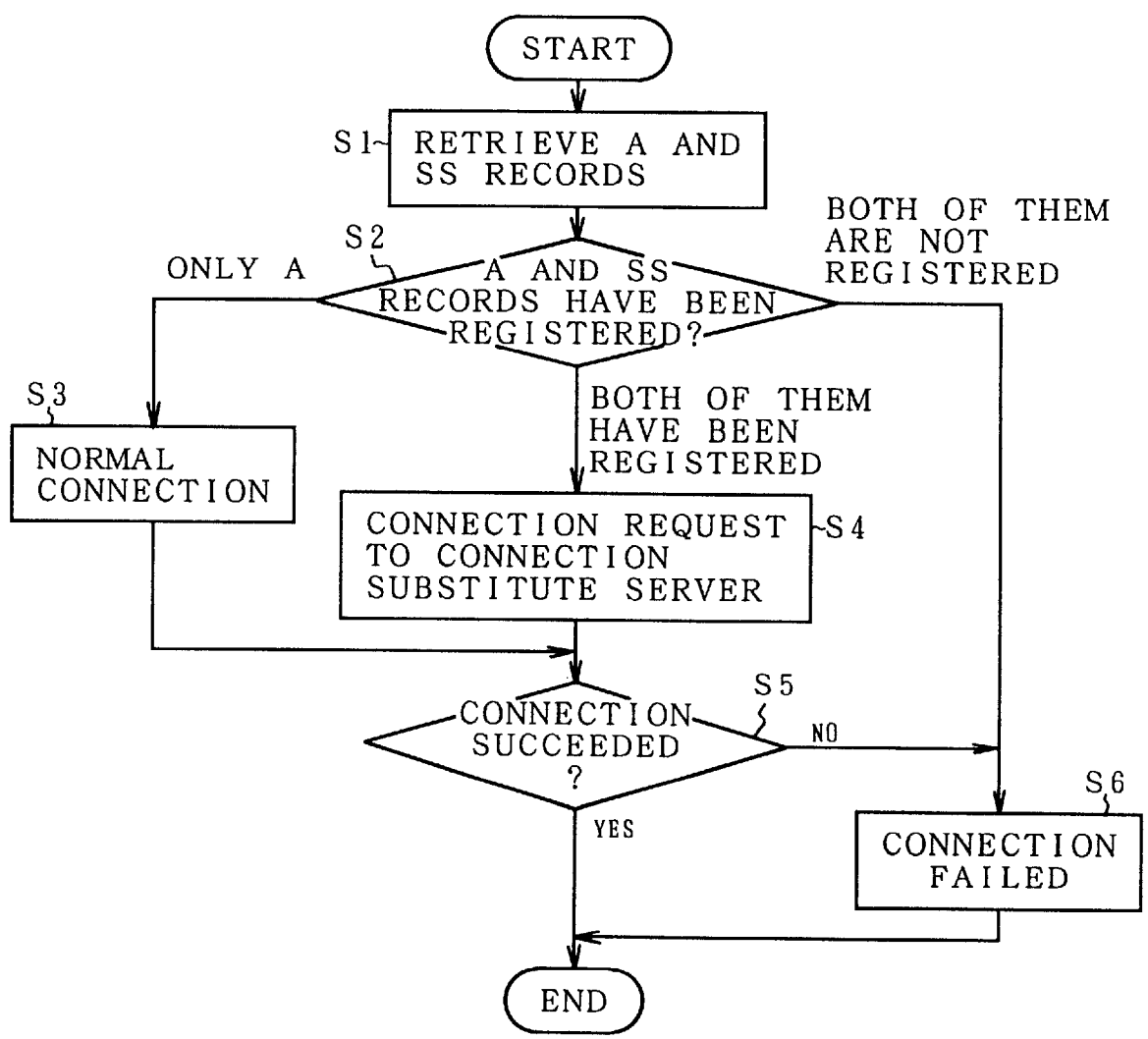
FIG. 6 is a flowchart for the processing operation of a connection substitute correspondence client in FIG. 2.

A flowchart of FIG. 6 shows the processing operation of the connection substitute correspondence client 10 in FIG. 2. In FIG. 1, it is assumed that a connection request to the host 24 having the informal address 38 provided for the organization 200 different from the organization 100 was executed by a designation of the host name of the host 24. In response to the connection request, as shown in FIG. 2, the name server retrieving mechanism 42 of the connection substitute correspondence client 10 requests the name server 12 to retrieve the address information 15 and connection substitute server information 14. In response to an inquiry from the connection substitute correspondence client 10, the name server 12 retrieves the address information 15 and connection substitute server information 14 and inquires of the name server having address information and connection substitute server information of another organization as necessary. When the address information and connection substitute server information corresponding to the host name which received the inquiry have been registered, the result of retrieval is replied to the connection substitute correspondence client 10. When they are not registered, this fact is replied. In this instance, the "A" record indicative of the address information and the "SS" record indicative of the connection substitute server information are retrieved in step S1 in FIG. 6. In step S2, by the reply from the name server 12, the control mechanism 40 of the connection substitute correspondence client 10 judges whether the "A" record indicative of the address information and the "SS" record indicative of the connection substitute server information have been registered or not. In this instance, when only the "A" record indicative of the address information has been registered, since the address information indicates the formal address, the processing routine advances to step S3. A connection by an ordinary method without intervening the connection substitute server 22 is requested to the connecting mechanism 44. As shown in the host 52, for example, the connecting mechanism 44 directly connects to the host 52 having an object of a communication. In step S5, when a success in connection is confirmed, the processing routine is finished. On the other hand, in step S2, when the control mechanism 40 confirms that both of the "A" record indicative of the address information and the "SS" record indicative of the connection substitute server information have been registered, step S4 follows. A connection via the connection substitute server 22 having the host name and formal address obtained as connection substitute server information is requested. The connecting mechanism 44 connects to the connection substitute server 22 and connects to the host 24 having the informal address 38 serving as a connection request destination. The system waits for the end of the success in connection in step S5 and finishes a series of processes. Further, when the control mechanism 40 confirms that neither the "A" record indicative of the address information nor the "SS" record indicative of the connection substitute server information is registered in step S2, this means that there is an error in the host name itself serving as a connection request destination. Therefore, an error message indicative of a connection failure is generated in step S6 and the series of processes are finished. In FIGS. 1 and 2, although the example in which the informal address is used as an address of the host 24 having no formal address has been shown and described, the same effect will be obtained even if a local address (private address based on the standard RFC1597) which is used in the organization and doesn't flow path information to the outside is used in place of the informal address.

Figure 7:
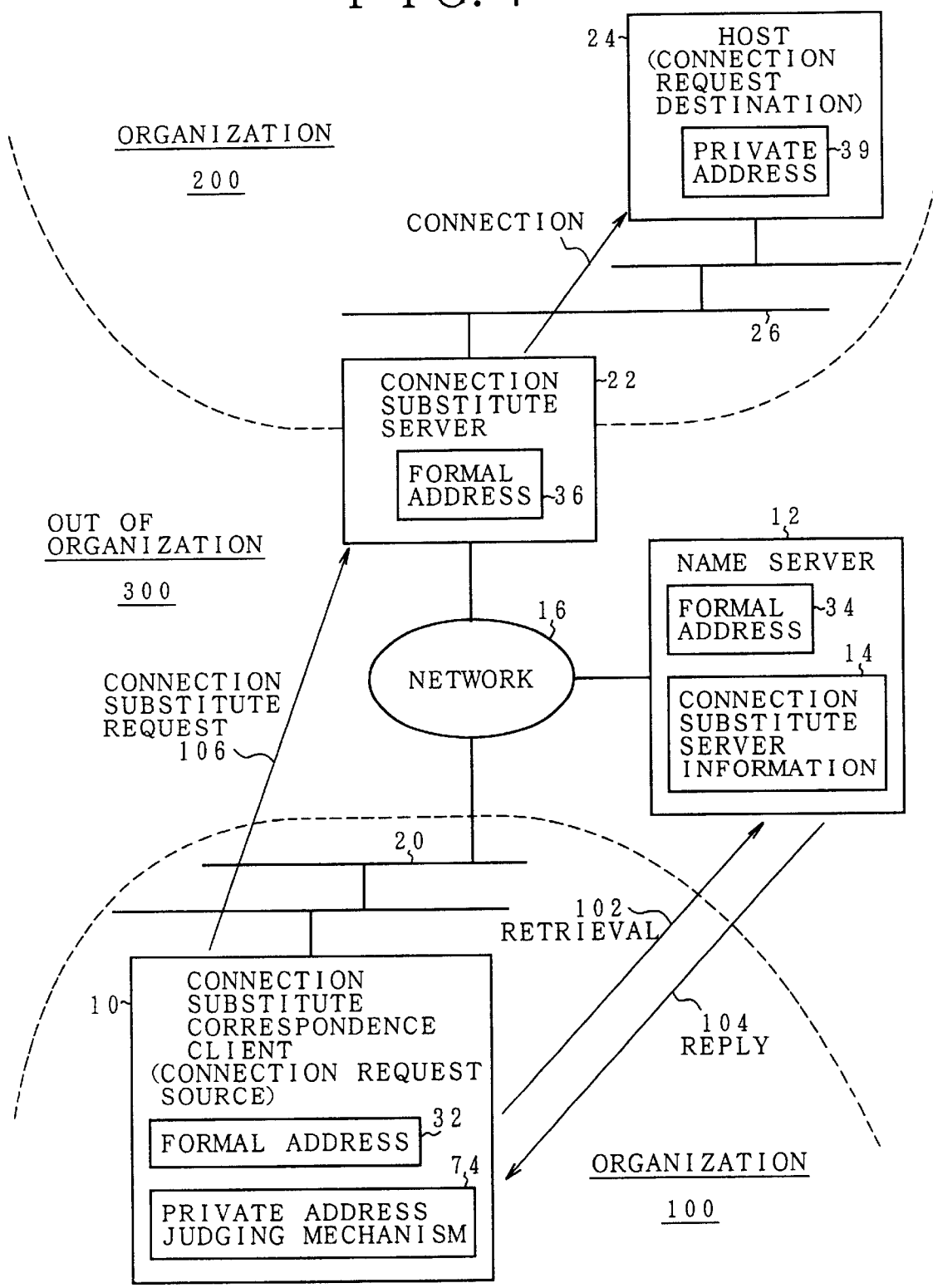
FIG. 7 is a system block diagram of the second embodiment of the invention.

FIG. 7 is a system constructional diagram of the second embodiment of the invention. The embodiment is characterized in that the private address of RFC1597 is used as a local address and a private address judging mechanism 74 is newly provided for the connection substitute correspondence client 10. Since the private address judging mechanism 74 is provided for the connection substitute correspondence client 10, as shown in the connection substitute correspondence client 10 in FIG. 8, the name server retrieving mechanism 42 of the connection substitute correspondence client 10 in the first embodiment in FIG. 2 is divided into an address retrieving mechanism 70 and a connection substitute server retrieving mechanism 72. Further, as for the host having no formal address like a host 24 in FIG. 7, only a private address 39 is used instead of the informal address of the first embodiment. Namely, in the present internet, although the informal address which is not formally allocated and the private address which can be used only in the organization are used as addresses other than the formal address, it is presumed in future that the use of the informal address is abandoned and that only the private address is used. In the second embodiment of FIGS. 7 and 8, therefore, when the address of the connection request destination is obtained by the first retrieval of the name server 12 using the host name by the connection substitute correspondence client 10, whether the replied address is the formal address or private address is judged by the private address judging mechanism 74. Only when it is judged that the address is the private address, the retrieval of the connection substitute server information 14 is requested to the name server 12. Thus, the unnecessary retrieval of the connection substitute server information 14 when the address information denotes the formal address is eliminated and a communication load for the name server 12 can be reduced.

Figure 8:
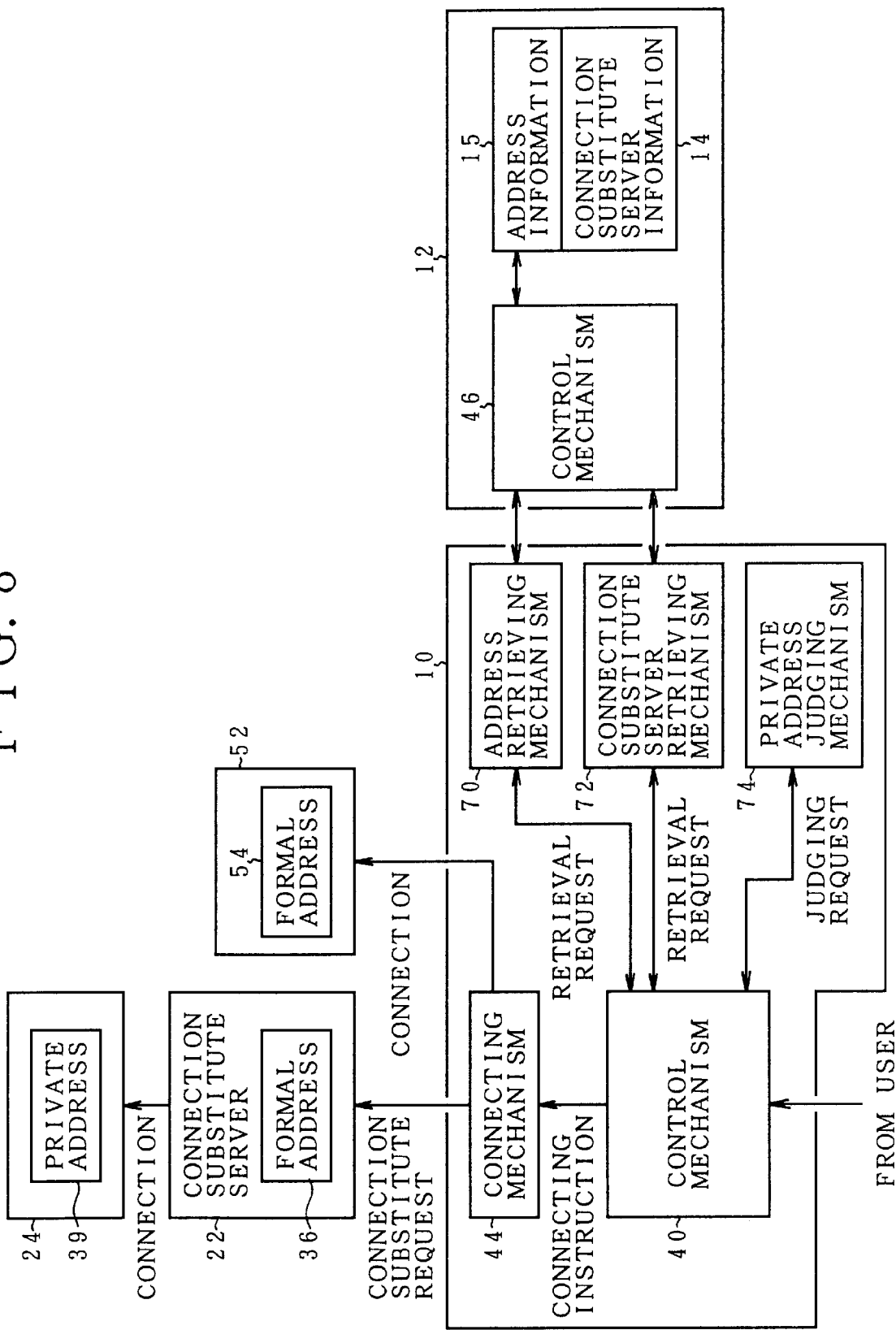
FIG. 8 is a functional block diagram of a connection substitute correspondence client in FIG. 7.

The connection substitute correspondence client 10 in FIG. 8 is constructed by the control mechanism 40, connecting mechanism 44, an address retrieving mechanism 70, a connection substitute server retrieving mechanism 72, and private address judging mechanism 74. The address retrieving mechanism 70 inquires of the name server 12 the address registration by the host name of the connection request destination. In response to the address inquiry, when the address information is replied from the name server 12, whether the replied address is the formal address or the private address is judged by the private address judging mechanism 74. When it is the formal address, the retrieval request to the name server by the connection substitute server retrieving mechanism 72 is not executed. A judgment result of the formal address is notified to the control mechanism 40. A normal connection without intervening the connection substitute server 22 is instructed to the connecting mechanism 44. When the private address judging mechanism 74 judges that the address replied from the name server 12 is the private address, on the basis of the judgment result, the control mechanism 40 requests the connection substitute server retrieving mechanism 72 to retrieve. The connection substitute server retrieving mechanism 72 designates the host name to the name server 12 and requests the retrieval of the connection substitute server information 14. When the host name and formal address of the connection substitute server are replied as a retrieval result from the name server 12, the control mechanism 40 instructs the connecting mechanism 44 to connect to the host 24 having the private address 39 via the connection substitute server 22. Further, when there is no address registration due to the reply by the retrieval by the address retrieving mechanism 70 or when there is no registration of the connection substitute server information due to the reply to the retrieval by the connection substitute server retrieving mechanism 72, the control mechanism 40 generates an error message and finishes the processes.

Figure 9:
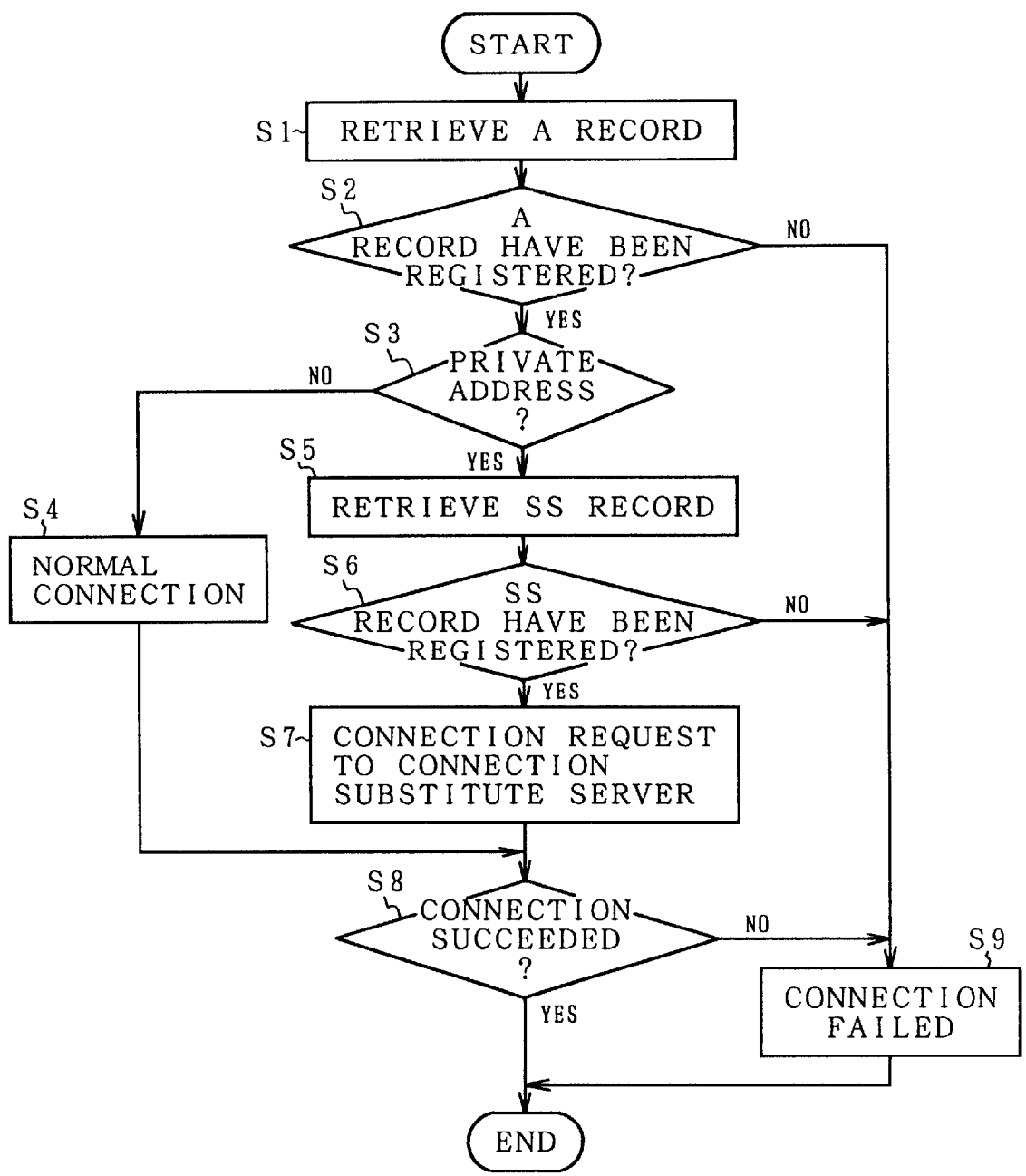
FIG. 9 is a flowchart for the processing operation of the connection substitute correspondence client-in FIG. 8.

A flowchart of FIG. 9 relates to the processing operation of the second embodiment of the connection substitute correspondence client 10 in FIG. 8. When there is a communication request in which the host name of the connection request destination for the connection substitute correspondence client 10 has been designated, first in step S1, the address retrieving mechanism 70 is activated and the retrieval of the "A" record as address information is requested to the name server 12. When a reply of the retrieval result is received from the name server 12, in step S2, a check is made to see if the "A" record as address information has been registered. When the "A" record has been registered, step S3 follows and whether the address is the private address or not is judged by the private address judging mechanism 74. When it is the formal address, step S4 follows and the control mechanism 40 requests the connecting mechanism 44 to connect by a normal method without intervening the connection substitute server 22. The connecting mechanism 44 directly connects to, for example, the host 52 having the formal address 54 serving as a connection request destination. In step S8, the system waits for a success in connection and finishes the series of processes. In step S3, when the private address judging mechanism 74 judges the private address, step S5 follows and the connection substitute server retrieving mechanism 72 requests the name server 12 to retrieve the "SS" record, namely, the retrieval of the connection substitute server information 14. With respect to a reply from the name server 12 for the retrieval request, a check is made in step S6 to see if the "SS" record has been registered. If YES, step S7 follows and on the basis of the host name and formal address of the connection substitute server 22 which were replied, the control mechanism 40 requests the connecting mechanism 44 to connect via the connection substitute server 22 and substitutes the connection with the host 24 of the connection request destination, thereby enabling data to be relayed. The system waits for a success in connection in step S8 and finishes the series of processes. Further, when there is no registration due to the reply to the retrieval of the "A" record in step S2 or when there is no registration due to a reply to the retrieval of the "SS" record in step S6, it is judged in step S9 that the connection fails, so that the system generates an error message and finishes the series of processes.

Figure 10:
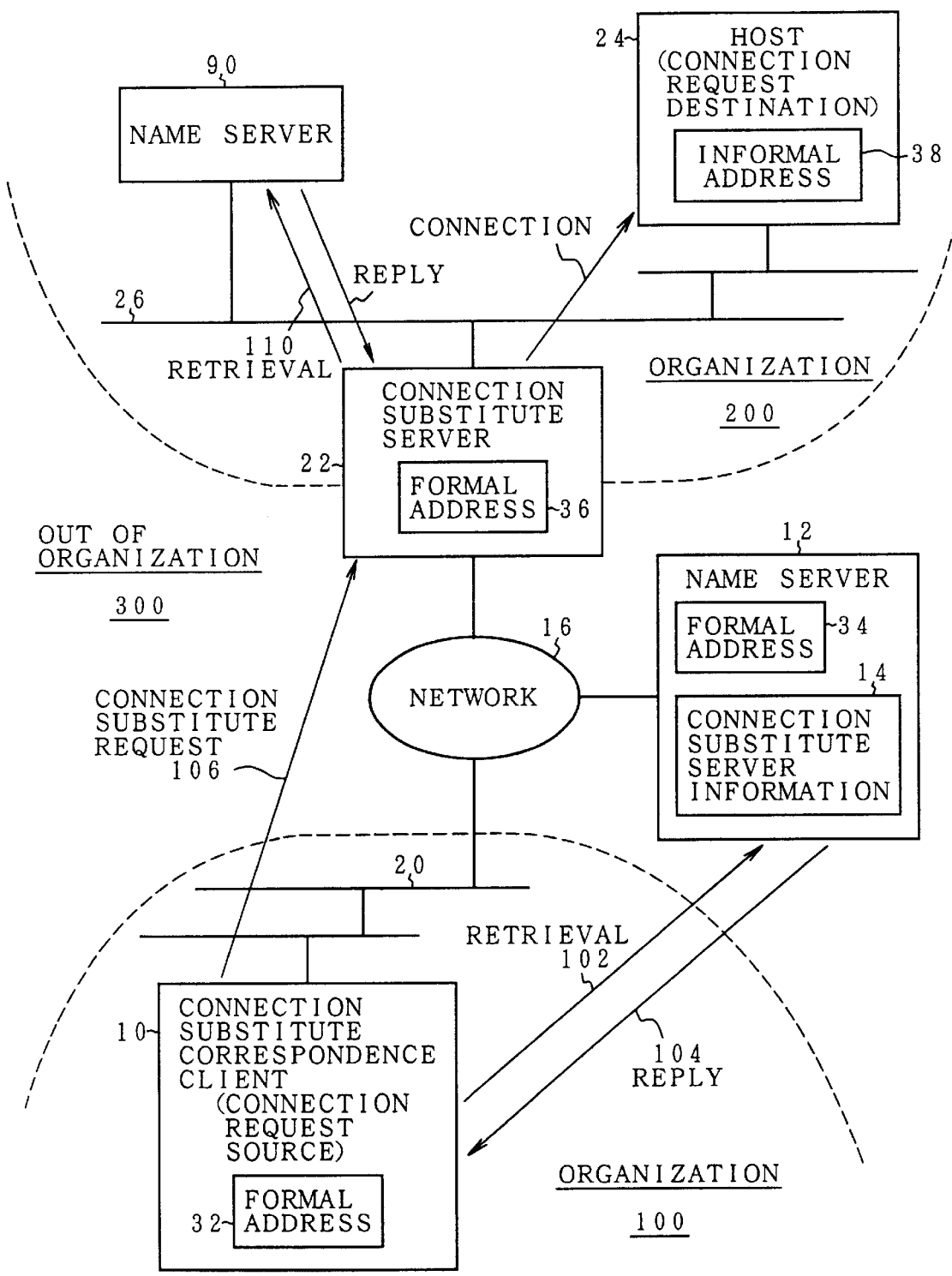
FIG. 10 is a system block diagram of the third embodiment of the invention.

FIG. 10 is a system constructional diagram of the third embodiment of the invention. The embodiment is characterized in that the name server 12 in which the correspondence relation between the host machine 24 having no formal address and the connection substitute server 22 has previously been registered as connection substitute server information 14 is added to the first name server and that a second name server 90 having the address information of the informal address or private address is newly provided in the organization 100. In the connection substitute correspondence client 10 on the organization 100 side, the embodiment can be realized by newly adding the function of the invention to an ordinary proxy client and the connection substitute server 22 is an ordinary proxy server. The details of the embodiment are substantially the same as FIG. 2. It is not executed at present in the world that the address such as informal address, private address, or the like which is not unique is generally published by the name server. In the first and second embodiments of FIG. 7, however, it is necessary that the informal address or private address using the host name as an index is generally published in the name server 12. In the third embodiment of FIG. 10, therefore, when the address of the connection request destination is not obtained by the retrieval of the first name server 12 using the host name by the connection substitute correspondence client 10 and only the connection substitute server information is derived by the retrieval of the connection substitute server information 14, the connection substitute by the host name of the host 24 is requested to the connection substitute server 22. When a connection request by the host name is received, the connection substitute server 22 performs the retrieval of the address by the host name to the name server 90. When the address is obtained, the connecting mechanism connects to the host 24. This operation is the operation of the ordinary proxy server.

A flowchart of FIG. 11 relates to the processing operation of the connection substitute correspondence client of the third embodiment of FIG. 10. When there is a communication request in which the host name of the connection request destination has been designated to the connection substitute correspondence client 10, first in step S1, the name server retrieving mechanism 42 is activated and the retrieval of the "SS" record as connection substitute server information and the "A" record as address information is requested to the connection substitute server 12. When receiving the retrieval result from the name server 12, in step S2, a check is made to see if the "A" record as address information and the "SS" record as connection substitute server information have been registered. In this instance, when only the "A" record indicative of the address information has been registered, since the address information indicates the formal address, step S3 follows and the connection by the normal method without intervening the connection substitute server 22 is requested to the connecting mechanism 44. The connecting mechanism 44 directly connects to the host 52 having a communication object as shown in, for example, the host 52. When a success in connection is confirmed in step S5, the processes are finished. In step S2, when the control mechanism 40 discriminates the registration of both of the "A" record indicative of the address information and the "SS" record indicative of the connection substitute server information, step S5 follows. The informal address 38 of the host 24 is presented and the connection via the connection substitute server 22 having the host name and formal address obtained as connection substitute server information is requested. The connecting mechanism connects to the host 24 having the informal address 38 serving as a connection request destination. The system waits for the end of the success in connection in step S5 and finishes the series of processes. When the control mechanism 40 discriminates the registration of only the "SS" record indicative of the connection substitute server information in step S4, step S6 follows. The host name of the host 24 is presented and the connection via the connection substitute server 22 having the host name and the formal address obtained as connection-substitute server information is requested. The connecting mechanism connects to the host 24 having the informal address 38 serving as a connection request destination. The system waits for the end of connection in step S6 and finishes the series of processes. Further, when it is recognized in step S2 that neither the "A" record indicative of the address information nor the "SS" record indicative of the connection substitute server information is registered, since there is error in the host name itself serving as a connection request destination, the control mechanism 40 generates an error message indicative of the connection failure in step S6 and finishes the series of processes. Although the embodiment of FIG. 10 has been described with respect to the example in which the informal address has been used as an address of the host 24 having no formal address, similar function and effect can be also obtained even when the local address which is used in the organization and doesn't flow path information to the outside, for example, the private address of the RFC1597 is used in place of the informal address.

According to the invention as mentioned above, for the connection of the host having the informal address or private address in a certain organization, the connection substitute correspondence client searches the information of the connection substitute server of the organization of the connection request destination by the host name from the name server, thereby specifying the connection substitute server to be used. A communication to the host having the informal address or private address via the connection substitute server of the connection request destination can be easily performed. Thus, in a manner similar to the host having the formal address, a result that is substantially equivalent to the case where the communication was directly performed can be given to the host having the informal address or private address in the organization when it is seen from the user side. A convenience of the communication using the network such as an internet or the like can be efficiently executed without being limited by the formal address. A situation such that only the private address is used as an address which is used only in the organization which cannot directly communicate with the inside of the organization and the informal address cannot be generally used is presumed. The function for judging whether the retrieval information obtained by the retrieval of the name server is the private address or not is provided for the connection substitute correspondence client. Only when the private address is judged, by requesting the retrieval of the connection substitute server information to the name server, the retrieval of the connection substitute server information when the formal address is obtained is made unnecessary. A communication amount for the name server can be reduced.

In the above embodiments, although the presentation of the connection substitute server information 14 for the connection substitute correspondence client 10 has been realized by a form such that the connection substitute server information 14 is added to the address information 15 which the name server ordinarily has, an exclusive-use apparatus for providing the connection substitute server information 14 can be also separately provided. Since the above first and second embodiments have been shown and described with respect to the example in which the socks server has been used as a connection substitute server, the connection substitute correspondence client 10 can be also used as a socks client to which the retrieving function of the connection substitute server information is added. Further, since the third embodiment has been described with respect to the example in which the proxy server has been used as a connection substitute server, the connection substitute correspondence client 10 has been realized as a proxy client to which the retrieving function of the connection substitute server information is added. However, a connection substitute correspondence client corresponding to a similar connection substitute server other than the above client can be also used.

What is claimed is:

1. A network connection system, comprising:
   a first organization with a host machine having a formal address;
   a plurality of second organizations, each with a host machine having either an informal address or a local address;
   a connection substitute server substituting a connection between the host machine belonging to the first organization and the host machine belonging to one of the plurality of second organizations and having no formal address and relaying information;
   a name server in which, as registration information regarding the host machine belonging to the one of the plurality of second organizations and the connection substitute server of the second organization corresponding thereto, the name server comprising
      a first record of an address including
         first host retrieval information in which a domain name is coupled with a host name of the one of the second organizations,
         first kind information showing that the registration information is an address, and
         an address of the host of the one of the second organizations,
      a second record of an address including
         second host retrieval information in which a domain name is coupled with the host name of the one of the second organizations,
         second kind information showing that the registration information is the connection substitute server, and
         connection substitute server retrieval information in which a domain name is coupled with a host name of the connection substitute server of the one of the second organizations, and
      a third record of an address including
         third host retrieval information in which a domain name is coupled with the host name of the connection substitute server of the one of the second organizations,
         third kind information showing that the registration information is the address, and
         an address of the connection substitute server of the second organization have been registered, and
      when a retrieval request using the host retrieval information of the one of the second organizations is received, in the retrieval at the first stage, connection substitute server retrieval information is obtained from said second record of the address, and in the retrieval at the second stage, the address of the second organization is obtained from said third record of the address by the connection substitute server retrieval information obtained by the retrieval at said first stage and responded to a request source.

2. A system according to claim 1, further comprising a connection substitute correspondence client requesting retrieval of said connection substitute server information, wherein said connection substitute correspondence client comprises:
   a retrieving mechanism for requesting a retrieval to said name server by the communication request in which the host name of the connection request destination has been designated;
   a control mechanism for instructing a connection with the connection request destination based on a retrieval result from said name server which was received by said retrieving mechanism; and
   a connecting mechanism for connecting with said connection request destination based on a connecting instruction from said control mechanism.

3. A system according to claim 1, wherein when a registration of a formal address of said connection request destination is recognized by the retrieval of said name server, said control mechanism of said connection substitute correspondence client instructs said connecting mechanism to connect to a machine having the formal address of the connection request destination.

4. A system according to claim 1, wherein when a registration of the connection substitute server information of said connection request destination is recognized by the retrieval of said name server, said control mechanism of said connection substitute correspondence client instructs said connecting mechanism to connect to the connection substitute server recognized.

5. A system according to claim 1, wherein when neither a registration of the formal address of said connection request destination nor a registration of the connection substitute server information can be recognized by the retrieval of said name server, said control mechanism of said connection substitute correspondence client notifies of a connection error and finishes process.

6. A system according to claim 1, further comprising a connection substitute correspondence client requesting retrieval of said connection substitute server information, wherein said connection substitute correspondence client comprises:
   an address retrieving mechanism for requesting a retrieval of address information of a connection request source to said name server when receiving the communication request in which the host name of the connection request destination has been designated;
   a local address judging mechanism for judging whether the address information registered in said name server is a local address or not by the retrieval of said address retrieving mechanism;
   a connection substitute server retrieving mechanism for requesting a retrieval of the connection substitute server information to said name server when said local address judging mechanism judges a registration of the local address;
   a control mechanism for instructing a connection with the connection request destination based on a judgment result of said local address judging mechanism and a retrieval result of said connection substitute server retrieving mechanism; and
   a connecting mechanism for connecting with said connection request destination based on a connecting instruction from said control mechanism.

7. A system according to claim 1, wherein when said local address judging mechanism discriminates a registration of a formal address of said connection request destination by the retrieval of said name server by said address information retrieving mechanism, said control mechanism of said connection substitute correspondence client instructs said connecting mechanism to connect with a host machine of the connection request destination having the formal address.

8. A system according to claim 1, wherein when the address information is not registered for the retrieval of said name server by said address retrieving mechanism, said control mechanism of said connection substitute correspondence client notifies of a connection error and finishes process.

9. A system according to claim 1, wherein when a registration of the connection substitute server information of said connection request destination is recognized by the retrieval of said name server by said connection substitute server retrieving mechanism, said control mechanism of said connection substitute correspondence client instructs said connecting mechanism to connect with the connection substitute server recognized.

10. A system according to claim 1, wherein when the connection substitute server information is not registered for the retrieval of said name server by said connection substitute server retrieving mechanism, said control mechanism of said connection substitute correspondence client notifies of a connection error and finishes process.

* * * * *